United States Patent [19]

Yonezu et al.

[11] Patent Number: 4,689,571
[45] Date of Patent: Aug. 25, 1987

[54] SPECIFIC GRAVITY DETECTING DEVICE FOR LEAD-ACID BATTERY

[75] Inventors: Kunio Yonezu; Hidetsugu Nitta; Masaharu Tsubota, all of Kyoto, Japan

[73] Assignee: Japan Storage Battery Company Limited, Kyoto, Japan

[21] Appl. No.: 687,890

[22] Filed: Dec. 31, 1984

[30] Foreign Application Priority Data

Jan. 6, 1984 [JP] Japan ................................. 59-1171

[51] Int. Cl.$^4$ ........................................... G01N 27/46
[52] U.S. Cl. .................... 324/432; 73/32 R; 324/65 P; 324/437
[58] Field of Search ............ 324/432, 65 P, 437; 73/32 R, 433, 436, 437, 442

[56] References Cited

U.S. PATENT DOCUMENTS

| | | |
|---|---|---|
| 2,844,532 | 7/1958 | White et al. ................. 324/432 X |
| 3,060,374 | 10/1962 | Strain ............................ 324/65 P |
| 3,060,375 | 10/1962 | Godshalk et al. ............... 324/437 |
| 3,657,639 | 4/1972 | Willihnganz ..................... 324/432 |
| 4,011,746 | 3/1977 | Weitz, Jr. et al. .............. 73/32 R |

*Primary Examiner*—Reinhard J. Eisenzopf
*Assistant Examiner*—Robert W. Mueller
*Attorney, Agent, or Firm*—Sughrue, Mion, Zinn, Macpeak & Seas

[57] ABSTRACT

A specific gravity detecting apparatus for a lead-acid battery having two electrodes adapted to be immersed in an electrolyte to provide a potential difference therebetween which is indicative of the specific gravity of the electrolyte. One of the two electrodes is a lead electrode composed of a collector 6 made of lead and a lead alloy and a porous lead body 4 covered by an acid resistant porous sleeve 3; the other is a lead dioxide electrode composed of a collector 6' made of lead and a lead alloy and a porous lead dioxide body 5 covered by an acid- and oxidation-resistant porous sleeve 3'. The two electrodes are charged normally or as required while there is no necessity of obtaining specific gravity data, and later discharged with another lead electrode as an opposite electrode so that, in the open-circuit state, the potential difference between the lead electrode and the lead dioxide electrode is accurately determined. In preferred embodiments, the two electrodes and a temperature sensor having an acid-resistant material as its outer portion are mounted in a single molded body 1 made of an acid-resistant material.

7 Claims, 8 Drawing Figures

SPECIFIC GRAVITY DETECTING DEVICE FOR LEAD-ACID BATTERY

BACKGROUND OF THE INVENTION

This invention relates to a specific gravity detecting device for a lead-acid battery and, more particularly, to the construction of an electrode-type specific gravity measuring unit and a method for stabilizing the potential of electrodes used for the unit.

In a lead-acid battery, the specific gravity of the electrolyte is raised and lowered as the battery is charged and discharged, respectively. Accordingly, the specific gravity of the electrolyte is indicative of how much the battery is charged or discharged. Various types of specific gravity sensors have been developed which provide an output that changes according to changes in the specific gravity of the electrolyte. A relatively simple one among these is the electrode-type sensor. In one version of the specific gravity sensor, the difference in potential between a reference electrode immersed in dilute sulfuric acid of known specific gravity and an electrode immersed in the electrolyte of the battery provides an indication of the specific gravity of the electrolyte of the battery. However, this type of specific gravity sensor is disadvantageous in that it is difficult to maintain the specific gravity of the electrolyte in the reference electrode constant and to prevent the reference electrode from deteriorating due to a self-discharge phenomenon. In another version of the specific gravity sensor of the electrode type, the difference in potential between two electrodes having different potential vs. specific gravity characteristics is employed as an indication of the specific gravity of the electrolyte. A typical example of such a sensor employs electrodes of lead and lead dioxide. However, if the lead or lead dioxide electrode is made of a nonporous material, lead sulfate tends to form on the surface thereof in a short time, thus preventing accurate measurement. In yet another electrode construction, a collector lattice is filled with porous lead or lead dioxide. This construction too is disadvantageous in that the lead dioxide electrode undergoes the elution of antimony, which then attaches to the lead electrode, thus undesirably changing the potential of the electrode. This construction is also disadvantageous in that there is a strong tendency for the lead dioxide electrode to undergo a vigorous self-discharge, resulting in changes in the volume thereof, sometimes causing the porous lead dioxide to become detached from the collector lattice.

SUMMARY OF THE INVENTION

Therefore, it is an object of the invention to provide a specific gravity detecting device which provides an output which is stable with respect to electrolyte specific gravity for long periods of time.

To this end, the invention provides a lead electrode which comprises a collector made of lead and a lead alloy and a porous lead body covered by a porous acid-resistant tube and a lead dioxide electrode which comprises a collector made of lead and a lead alloy and a porous lead dioxide body covered by a porous acid- and oxidation-resistant tube. These two electrodes are immersed in an electrolyte, and a potential difference therebetween is converted to data indicative of the specific gravity of the electrolyte. Preferably, prior to the measurement of specific gravity, the lead electrode and/or the lead dioxide electrode is charged while there is no necessity of obtaining specific gravity data, and later discharged with another lead electrode or the like as an opposite electrode. For the measurement of specific gravity, the difference in potential between the lead dioxide electrode and the lead electrode in the open-circuit condition is determined.

DESCRIPTION OF THE PREFERRED EMBODIMENTS

Figure 1:
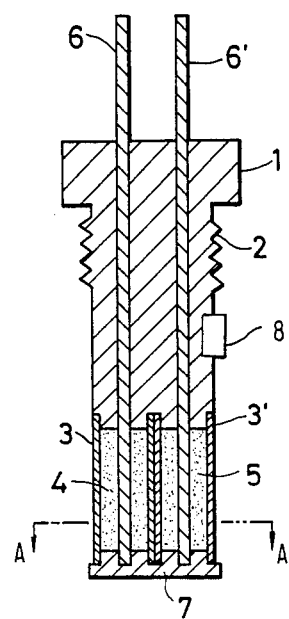
FIG. 1 shows a vertical section of an essential part of an electrode portion of a specific gravity detecting apparatus of the invention.
Figure 2:
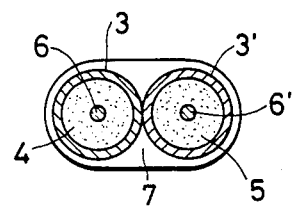
FIG. 2 shows an enlarged section taken along a line A—A of FIG. 1.

The construction of the electrode portion (specific gravity detecting portion) of a specific gravity detecting device of the invention is illustrated in FIGS. 1 and 2. A molded body 1 is made of an acid resistant plastic. A thread 2 of the body 1 is used to mount the device to the battery. Indicated by reference numerals 3 and 3' are sleeves formed with woven fabric made of acid- and oxidation-resistant glass or plastic fibers or a porous sheet of a material such as rubber or polyolefin. Reference numeral 4 indicates a porous lead body which may be formed by the reduction of lead in paste or powdered form, as in the preparation of the active material for the negative pole of a normal lead-acid battery. Shown at 5 is porous lead dioxide body which may be formed in a manner similar to that used for preparing the active material for the positive pole of a normal lead-acid battery. Reference numerals 6 and 6' indicate collectors or conductors made of lead or lead alloy and which may be formed by casting or extrusion. If a lead alloy is used, it is preferably an alloy commonly employed for the lattice of a conventional lead-acid battery such as lead-antimony, lead-tin, lead-arsenic or lead-calcium. At 7 is indicated a lower cover for the sleeves 3 and 3'. The porous lead body 4 and the collector 6 are covered by the sleeve 3 to provide a lead electrode, while the porous lead dioxide body 5 and the collector 6' are covered by the sleeve 3' to provide a lead dioxide electrode. These electrodes form an integral body with the molded body 1. The collectors 6 and 6' may be connected to another electrically conductive material such as copper wire in the molded body 1 to provide external connections.

Figure 3:
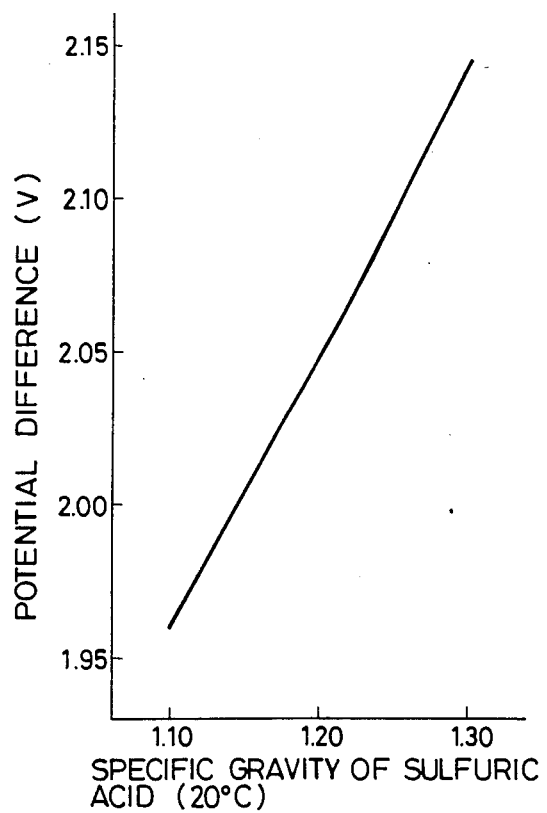
FIG. 3 shows a characteristic curve illustrating the relationship between the specific gravity of the electrolyte and the potential difference obtained by the detecting device of the invention.

FIG. 3 shows the relationship between the specific gravity of dilute sulfuric acid (the electrolyte) and the difference in potential between the two electrodes in a specific gravity detecting device of the above construction which is immersed in the dilute acid under various conditions. As can be seen in FIG. 3, an approximately linear relationship exists between the specific gravity $\rho$ of sulfuric acid (at 20° C.) and the potential difference. The relationship is given by:

$$\rho = 1.087V - 1.028. \tag{1}$$

The potential difference varies with the temperature of the electrolyte. In the temperature range within which an automotive battery is generally used, the electromotive force V' generated by the two electrodes at a given temperature of the electrolyte is preferably corrected by the following equation to provide a more accurate value of V:

$$V = V' + 0.0002(T - 20). \tag{2}$$

In order to measure the temperature of the electrolyte, a temperature sensor 8, as illustrated in FIG. 1 such as a thermocouple or thermistor coated with an acid resistant material may be used. Since this temperature sensor should be installed close to the two electrodes, these three elements may be mounted in one molded body.

If the specific gravity of the electrolyte is within the range of 1.10 to 1.30, the relationship between the specific gravity of the electrolyte and the potential difference between the lead and lead dioxide electrodes is very closely given by the electromotive force equation determined from the electromotive reaction of lead-acid batteries as follows from the familiar Nernst equation:

$$E = E^0 + \frac{RT}{2F} \ln \frac{a^4(H^+) \times a^2(SO_4^{--})}{a^2(H_2O)} \tag{3}$$

$$= 2.02 + 0.059 \log \frac{a(H_2SO_4)}{a(H_2O)}$$

$$\simeq 2.02 + 0.059 \log a(H_2SO_4),$$

where E° is the standard value of the electrode potential, n is the valance change, and a (·) represents an activity.

Figure 4:
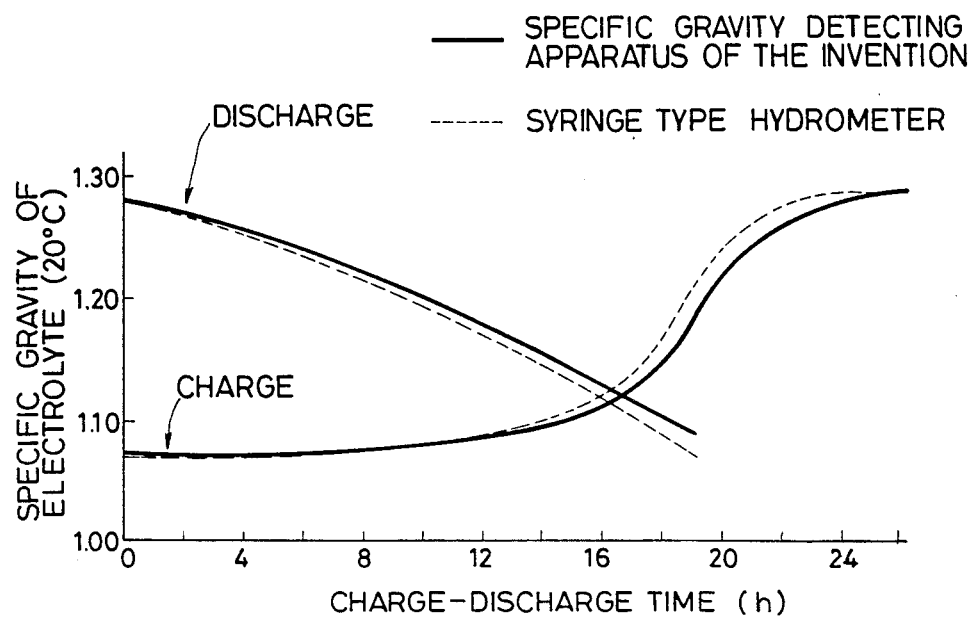
FIG. 4 shows a characteristic curve illustrating results of the measurement of the specific gravity of the electrolyte in a lead-acid battery by a specific gravity detecting device of the invention and a syringe-type specific gravity hydrometer while the battery is undergoing a charge-discharge operation.

FIG. 4 shows the results of the detection of changes in the specific gravity of the electrolyte of an automobile lead-acid battery incorporating a specific gravity detecting device of the invention as the battery is discharged and charged at a constant current averaged over 20 hours, and also results obtained with a conventional suction-type specific gravity hydrometer. As can be seen in FIG. 4, due to the porosity of the lead electrode and the lead dioxide electrode, there is a response time delay of about 20 minutes with respect to that of the syringe-type specific gravity hydrometer. However, this gives rise to no substantial problem in practical use.

Figure 5:
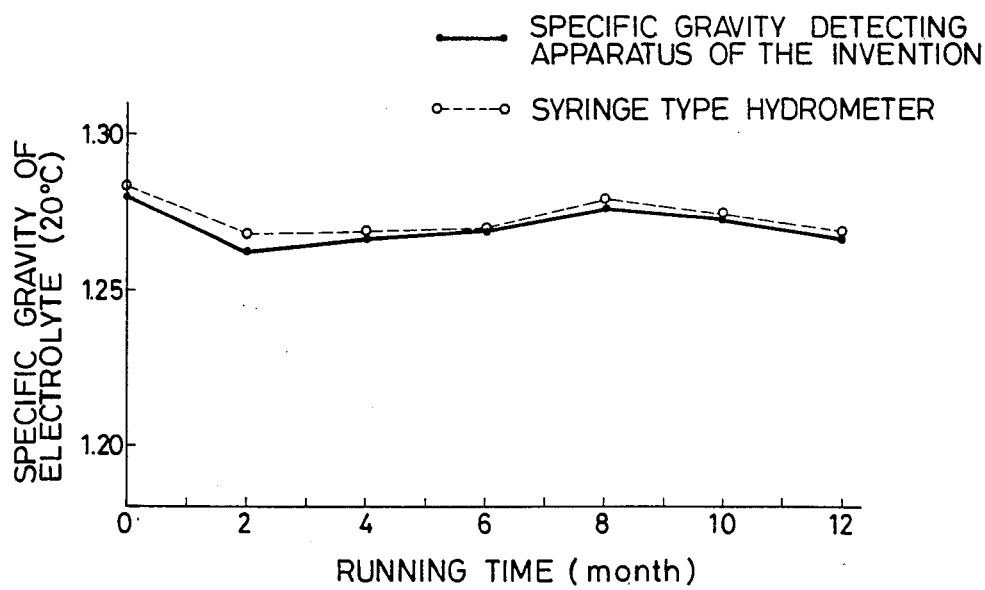
FIG. 5 shows a characteristic curve illustrating results of the measurement of the specific gravity of the electrolyte in an automobile lead-acid battery by a specific gravity detecting device of the invention and a syringe-type specific gravity hydrometer while the lead acid battery is mounted in the car.

FIG. 5 shows the results of the detection of changes in the specific gravity of the electrolyte of an automobile lead-acid battery incorporating a specific gravity detecting device of the invention when the battery is in ordinary use and also results obtained with a suction-type specific gravity hydrometer. As can be seen in FIG. 5, the two values showed substantial coincidence for about one year.

As is well known, lead and lead dioxide electrodes react with sulfuric acid to form lead sulfate. When the amount of lead sulfate thus formed exceeds a specified limit, the acutal output potential of the device differs substantially from the electromotive force predicted by the graph of FIG. 3. This means that Equation (1) fails beyond this limit.

For example, in tests, lead and lead dioxide electrodes showed a drastic increase or decrease in potential after being immersed in dilute sulfuric acid having a specific gravity of 1.260 (at 20° C.) at a temperature of 60° C. for 12 months and 5 months. The analysis of these electrodes after immersion showed that the former and the latter contained about 80% and about 50% lead sulfate, respectively.

The rate of self-discharge of lead dioxide electrodes is primarily determined by the crystal form of the material forming the electrodes. An active material for the positive electrode plate of lead accumulators prepared according to the ordinary method and a $\beta$—PbO$_2$ electrode plate were immersed in dilute sulfuric acid with a specific gravity of 1.260 (at 20° C.) at a temperature of 60° C. for 50 days. The former contained about 30% of $\alpha$—PbO$_2$ and about 70% of $\beta$—PbO$_2$, while the latter contained 100% of $\beta$—PbO$_2$. As a result, the former yielded 55% of PbSO$_4$ and the latter 6% of PbSO$_4$, thus showing a significant difference in the self-discharge rate.

In order to reduce the amount of such loss of the lead and lead dioxide electrodes caused by reaction with sulfuric acid, the electrodes may be charged. This charge may be applied directly between the lead electrode and the lead dioxide electrode, or the same effect can be obtained by using as the electrodes of the detecting device positive and negative pole plates of the battery. Furthermore, this charge can be provided with the use of a third electrode. Still further, the bias potential may be applied by connecting the detector electrodes in parallel with positive and negative terminals of the battery. The potential of the lead and lead dioxide electrodes immediately after charging differs drastically from that in the open-circuit state after stabilization. Therefore, it is difficult to obtain an accurate detection of the specific gravity unless the charged state of the electrodes is controlled. Accordingly, measurement of the specific gravity should only be carried out after the electrode potential has stabilized, that is, after the completion of their charging. To this effect, the electrodes may be charged whenever there is no necessity for detecting the specific gravity.

Figure 6:
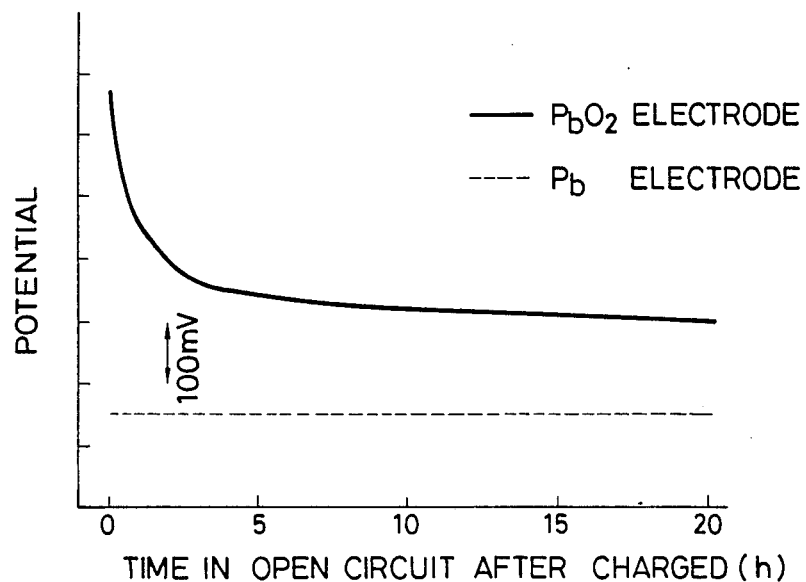
FIG. 6 shows a characteristic curve illustrating potential changes of lead and lead dioxide electrodes in the open-circuit state after being charged.

FIG. 6 shows the potential change of lead and lead dioxide electrodes in the open-circuit condition after being charged. As can be seen in FIG. 6, the lead dioxide electrode needs as long as 10 hours or more to stabilize in potential, while the lead electrode needs only one hour or less to do so.

Figure 7:
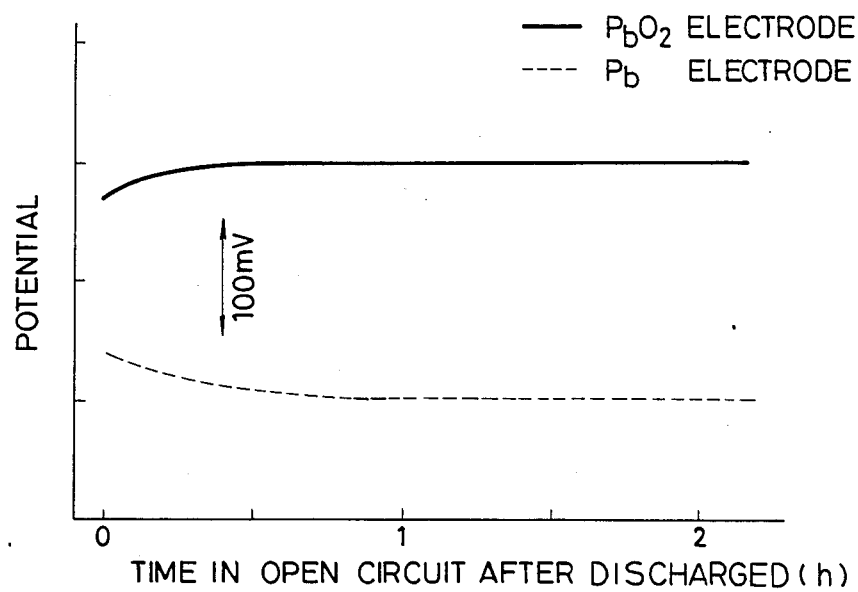
FIG. 7 shows a characteristic curve illustrating potential changes of lead and lead dioxide electrodes in the open circuit state after being discharged.

FIG. 7 shows the potential change of lead and lead dioxide electrodes in the open-circuit condition after being charged and then discharged. In this case, the lead electrode needs a longer time than the lead dioxide electrode to stabilize in potential.

The potential of the lead dioxide electrode which has been stabilized in the open-circuit condition after being discharged differs somewhat from that after being charged. After being charged, the relationship between the potential difference between the lead dioxide and lead electrodes and the specific gravity $p$ of the electrolyte is represented by the following equation:

$$p = 1.087V - 1.023. \qquad (4)$$

Thus, as compared to Equation (1), the value of V is 5 mV more.

The above result shows that the lead dioxide and lead electrodes are preferably used for measurement in the open-circuit condition after being charged and then discharged or immediately after being charged.

Figure 8:
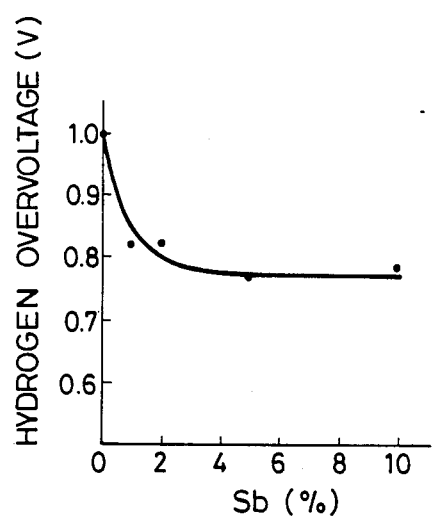
FIG. 8 shows a characteristic curve illustrating the relationship between the antimony content and the hydrogen overvoltage of a collector of the lead electrode.

The open-circuit potential of the lead electrode is determined by the potential produced by the reversible reaction of lead with lead sulfate and the potential produced by the generation of hydrogen gas on the lead electrode. The amount of antimony deposited on the lead electrode affects the amount of hydrogen gas generated, and hence the open-circuit potential of the electrode. FIG. 8 shows the relationship between the amount of antimony and the hydrogen overvoltage on the collector of the lead electrode. As can be seen in this figure, the hydrogen overvoltage changes rapidly when the antimony content is at a small value.

Generally, the lattice of a lead-acid battery is made of a lead-antimony alloy. This antimony component tends to deposit on the negative pole plate and the lead electrode. Accordingly, it is effective to previously allow a small amount of antimony to be deposited on the lead electrode in order to minimize the potential change of the lead electrode due to the deposition of antimony. This may be attained by employing a lead-antimony alloy for the collector of the lead dioxide electrode. Furthermore, in order to improve the durability of the lead dioxide electrode during the charge-discharge cycle, a lead-antimony alloy is preferably used for the collector, as is otherwise well known, particularly, in a weight proportion of antimony of 1% or more. Doing so is effective to maintain the hydrogen overvoltage constant, thus contributing to stabilizing the measurement potential.

As is believed evident from the above description, the invention enables the provision of a specific gravity detecting device which provides as an output a potential difference that is stable for long periods of time.

We claim:

1. A specific gravity detecting device for immersion in electrolyte of a lead-acid battery, comprising: a housing; a first electrode secured within the housing and comprising a first conductor (6) made of lead and a lead alloy; a porous lead body (4) surrounding a portion of the conductor extending outwardly from the housing; and an acid-resistant porous sleeve (3) covering the porous lead body and peripherally insulating the porous lead body from direct contact with the electrolyte; and a second electrode secured within the housing and comprising a second conductor (6') made of lead and a lead alloy; a porous lead dioxide body (5) surrounding a portion of the second conductor extending outwardly from the housing; an acid- and oxidation-resistant porous sleeve (3') covering the porous lead dioxide body and peripherally insulating the porous lead dioxide body from direct contact with the electrolyte; and means to insulate ends of said portions of the conductors extending outwardly from the housing.

2. A specific gravity detecting device as recited in claim 1, wherein said porous lead dioxide body is made of 100% $\beta$—$PbO_2$.

3. A specific gravity detecting device as recited in claim 1, further comprising: a temperature sensor having an outer portion formed of an acid-resistant material and mounted in the housing.

4. A specific gravity detecting apparatus as recited in claim 1, wherein a charge is applied to at least one of said lead electrode and said lead dioxide electrode to further suppress the electrodes from reacting with the sulfuric acid and forming lead sulfate.

5. A specific gravity detecting device as recited in claim 1, wherein at least one of said first electrode and said second electrode is charged and then discharged prior to taking a measurement of said potential difference.

6. A specific gravity detecting device as recited in claim 1 wherein the conductor of the arms of the second electrode is made of a lead-antimony alloy having an antimony content of at least 1% by weight.

7. A specific gravity detecting device as recited in claim 1 wherein the housing comprises a molded body (1) with threads (2) thereon for securing the detecting device to the battery; the porous bodies being cylindrically shaped and concentrically disposed within the surrounding porous sleeves; the conductors being concentrically disposed within the porous bodies; the electrodes being mounted axially parallel within the molded body, and means to insulate ends of the conductors comprising a cover member (7) enclosing outer ends of the electrodes such that the conductors and porous bodies are isolated from direct contact with the electrolyte.

* * * * *